May 20, 1969  R. M. GRANT  3,445,855
METHOD AND APPARATUS OF HOLOGRAPHIC PLOTTING
Filed Jan. 4, 1967
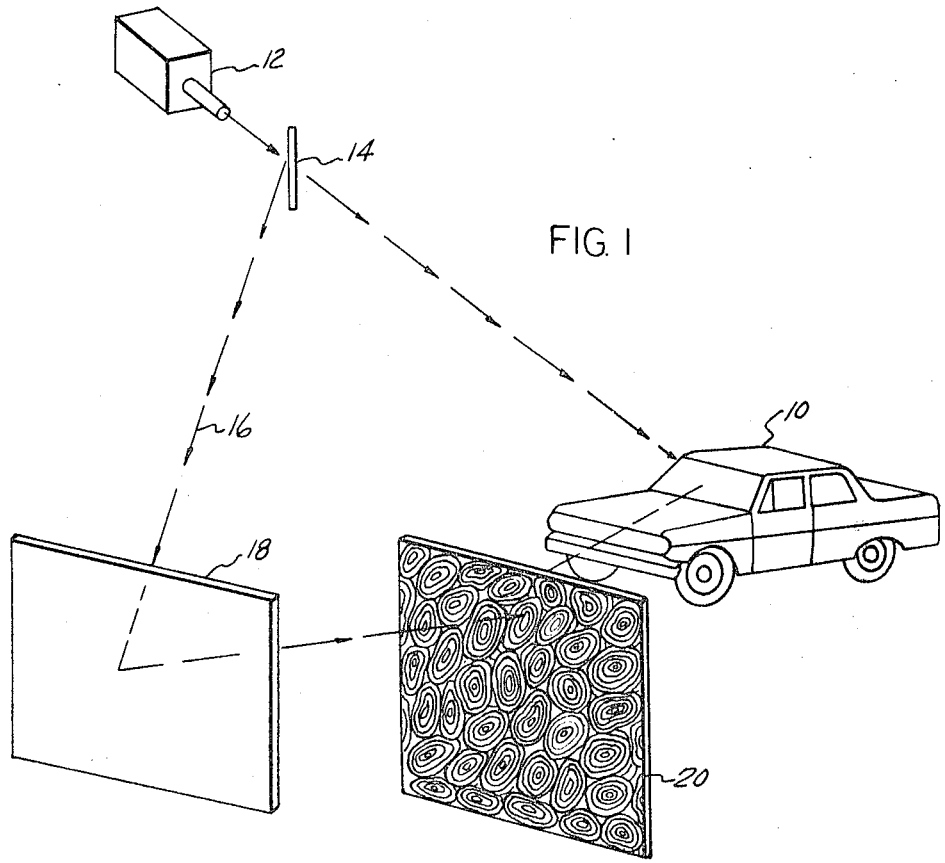
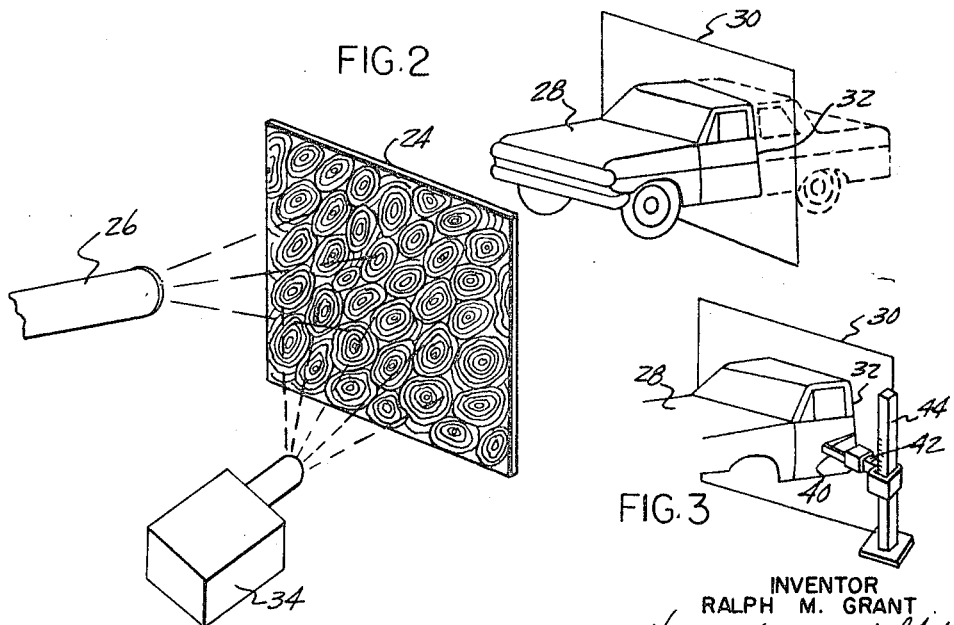
INVENTOR
RALPH M. GRANT United States Patent Office 3,445,855
Patented May 20, 1969

3,445,855
METHOD AND APPARATUS OF HOLOGRAPHIC PLOTTING
Ralph M. Grant, Ann Arbor, Mich., assignor, by mesne assignments, to GCOptronics, Inc., Ann Arbor, Mich., a corporation of Delaware
Filed Jan. 4, 1967, Ser. No. 607,310
Int. Cl. G01d 9/42
U.S. Cl. 346—1                10 Claims

ABSTRACT OF THE DISCLOSURE

The application discloses a system for defining the line of intersection of a plane with a three dimensional contoured object which consists of forming a photographic (hologram) record of the interference pattern between coherent light directly from the light source and light waves originating from the source which are reflected from the contoured object; developing the halogram; illuminating the hologram with an appropriate light source so as to create a virtual image of the contoured object; passing a planar surface through the virtual image so as to make visible the contour line representing the intersection between the plane and the contoured object; and recording information relating to the line either by photographing the virtual image with the planar surface passing through it or by determining the coordinates of points along the contour line by trigonometric or other techniques.

BACKGROUND OF THE INVENTION

Field of invention

The present invention pertains to apparatus and techniques for producing information relating to the coordinates of points along a three dimensional contoured object or body. Various techniques and apparatus have been previously developed for determining the contour of portions of the surface of the earth employing stereoptic methods and to define the contour of a smaller body by various stereoptic, gauging and lofting techniques.

Description of prior art

The present invention makes use of the technique of reconstructing the light wave fronts eminating from an object illuminated by coherent light by photographically recording the interference pattern between the coherent light reflected from the object and the coherent light arriving at the photographic media directly from the source, and later illuminating the developed photographic plate with an appropriate light source to create a three dimensional reconstruction of the original light reflected from the object. This technique, known as wave front reconstruction or holography, was first devised by D. Gabor (U.S. Patent No. 2,770,166). Later improvements in the technique of forming holograms employing a laser as the coherent light source are reported in an article entitled "Wavefront Reconstruction hPotography" by Leith and Upatnicks in Physics Today, August 1965, page 26. Still later improvements which allow the use of a noncoherent source to reconstruct the image are entitled "Wavefront Reconstruction Photography" by Images by George W. Strokes in Physics Today 23, 1965. A proper illumination of the hologram produces a virtual image of the original object which has all the optical properties of the original object. The image is truly three dimensional in that movement of the observer's line of vision within the confines of intersection with the hologram will produce a view of the object from a different angle. The present invention contemplates forming such a virtual three dimensional contoured object by holography and passing a planar surface through the contoured object at various positions. The line of intersection of the planar surface with the contoured surface will produce an optical image of the line which is the locus of all points on the contour of the object lying in the plane of the surface. This resultant image may be photographed to produce a graphical representation of such contour line or the coordinates of particular points on the contour line may be determined by trigonometric or gauging methods. This information can be used to graphically reconstruct the object or to prepare tapes for numerical control equipment which will machine the object out of solid materials.

It is therefore seen that this technique provides an inexpensive and convenient method of determining information relating to the surface of a complexly contoured body.

Description of drawings

Various objects, advantages and applications of the present invention will be made apparent by the following detailed description of several preferred embodiments of the invention. The description makes reference to the accompanying drawings in which:

FIGURE 1 illustrates the manner in which a hologram of an object may be produced;

FIGURE 2 illustrates the developed holograph of FIGURE 1 being illuminated to produce a virtual image, the disposition of a planar surface through the visual image to create a visual image of the line of intersection of the plane with the image, and camera means for recording the resultant contour line; and FIGURE 3 illustrates an alternative method of optically determining the coordinates of points along the contour line.

DESCRIPTION OF PREFERRED EMBODIMENT

The preferred embodiment of the invention will be illustrated with respect to the method and apparatus for generating the contour lines of a model 10 of an automotive vehicle. The model 10 represents any contoured three dimensional object which it is desired to specify by the generator of contour lines or coordinates of points along those lines. At the present time the object 10 must be of a relatively small size because of the unavailability of coherent light sources which produce a high enough intensity to illuminate a large object and reflect a sufficient amount of light to activate a photographic plate having superior definition capabilities in a reasonable amount of time. As more intense coherent light sources, and/or photosensitive plates having a high degree of sensitivity combined with a high degree of definition are developed, larger objects may be employed using the present inventive method and apparatus.

The object 10 will normally be either a naturally occurring one or more which is handmade using empirical techniques so that its contours are not easily defined by mathematical equations. In order to reproduce such an object it is normally desirable and often necessary to provide drawings or charts including the contour of the object at closely spaced parallel planes. In accordance with the present invention the first step in generating such contour line consists of the preparation of a hologram of the article 10 which it is illuminated, by coherent light. General techniques for the production of holograms are known to the art. The previously referred to Leith and Upatnick's article describes a first method of producing a hologram which must be illuminated with coherent light. The Stroke reference discloses an alternative method of producing a hologram which may be illuminated by noncoherent white light to reconstruct a three dimensional image of the original object. While either technique may be employed in connection with the present invention, the convenience of the latter technique leads to its use in connection with the preferred embodiment of this invention.

The object 10 is illuminated by light generated from a laser 12. While the literature of the prior art suggests a wide variety of lasers which are useful in this context, the preferred embodiment of the invention employs a continuous wave gas laser operating at 6.328 angstroms. The beam may be passed through a half silvered mirror 14 disposed obliquely to the line of the beam to produce a secondary coherent beam 16 which infringes on a mirror 18 and then is reflected to one side of a photographic plate 20. The photographic plate 20 is preferably in film form and may constitute a high resolution type such as Kodak 649F. The plate 20 is disposed between the mirror 18 and the object 10, and the geometry is such that the object reflects coherent light from the laser 12 onto the side opposite of the photographic plate 20 which receives the direct coherent beam from the mirror 18. The interaction between the direct light beam from the mirror 18 and the reflected light beam from the object 10 produces fringelike interference patterns which activate the photosensitive material of the plate. In general, the spacing of the interference fringes is proportional to the phase difference between the direct light and the reflected light and the intensity of the fringes is proportional to the intensity of the reflected light. Thus, a permanent record of both the intensity and phase of the light reflected from the object is made.

After development in the normal manner the hologram 24 thus produced may be illuminated by a source of white light 26 located in the same general position as was the mirror 18 in the production of the hologram, to create the virtual image 28 which is optically identical to the object 10, when viewed through the hologram 24. As the observer's line of vision through the hologram is shifted other aspects of the virtual image 28 may be observed in just the same manner as the movement of line of vision with respect to the object 10 would reveal other aspects of the object. The only limitation is that the line of view must be through the hologram 24.

By suitably supporting a sheet member 30 having a planar surface so that it passes through the image 28 of the object the same visual result will be obtained as if the plane surface 30 were passed through object 10. Thus, the contour line 32 which represents the line of intersection of the virtual image 28 with the plane surface 30 will become optically visible. The plane surface 30 may be disposed in any desired position wherein it intersects the virtual image 28. Since the contour line 32 represents the locus of all points on the surface of the object in the plane of the member 30 it provides information which is useful in reconstructing the object 10 or in preparing drawings or a numerical control tape for such reconstruction.

The information may be recorded for utilization in a variety of manners. As shown in FIGURE 2 it may be simply photographed by a camera 34 which is preferably positioned so that its film surface is parallel to the surface 30. Thus, a permanent image of the contour line 32 is formed.

When an object like 10 is utilized in the process of the present invention the entire contour line cannot be seen from one side of the object. In order to produce a contour line representing the entire perimeter of the object it is necessary to form a plurality of holograms or to use a technique for forming a hologram which offers a 360° view of its object as is described in the Japanese Journal of Applied Physics, page 816, line 4 (1965).

Following the photographing of one contour line 32 the plane may be moved a discrete distance to its second position parallel to its first position, and the new contour line developed at the intersection between the plane and the virtual image 28 at that position may be similarly recorded. A full set of contour lines would represent sufficient information about the object to accurately reconstruct it. These recorded contour lines are the equivalent of the result of a lofting process.

If the object were a topographical model or actually a section of the earth's surface the resulting contour lines of planes taken parallel to the earth's surface would be the equivalent to the results achieved by photogrammetric techniques.

When using the technique of the present invention in connection with an actual photograph of a large section of the earth it may be desirable to employ electromagnetic radiations of frequencies other than the optical band in order to form the hologram. These longer wave lengths would avoid interference by atmospheric or cloud layers and would also minimize the distortion in the resultant hologram as a result of movement of the camera because of the relatively wider spacing of the fringes produced. Since the transmission and reception of electromagnetic radiation, other than frequencies near the optical, is essentially single dimensional, it is necessary to form the hologram by moving the receiver so as to scan a plurality of spacial lines. In such a process the transmitted coherent radiation may be supported in an aircraft independent of the receiver.

FIGURE 3 discloses a method of quantizing the contour line to produce the digital coordinates of spaced points along the line. The virtual image 28 is produced in the same manner as shown in FIGURE 2 and is actually probed with a gauging device which employs a probe arm 40 supported for movement on both a horizontal arm 42 and a vertical arm 44. The position of the probe arm 40 along the arms 42 and 44 determines the coordinate of any position which it contacts. The probe is brought into contact with various points along the contour line 32 and the coordinate of these points are recorded for later use.

Other trigonometric or triangulation methods might be employed to determine the coordinates, or electronic gauging devices of the type manufactured by Sheffield Instrument Company of Dayton, Ohio, might be employed to determine coordinates of the points.

Having thus described my invention, I claim:

1. The method of determining the coordinates of points along a three dimensional contoured object with respect to reference planes, comprising: transmitting coherent electromagnetic radiation so that it impinges both on a receiver adapted to record the radiation and on said three dimensional contoured object and reflected radiation from the object impinges on the receiver; developing a photographic record of the interference patterns between the direct radiation and the reflected radiation; illuminating the resultant hologram with visible light so as to reconstruct the wave fronts of the original reflected radiation and thereby create a virtual image of the three dimensional object; supporting a planar surface so that it passes through said virtual image and makes visible a contour line representing the intersection between said planar surface and the surface of the object; and recording information relating to said contour line.

2. The method of claim 1 wherein said electromagnetic radiation is in the optical range and said receiver is a photographic plate.

3. The method of claim 2 wherein said contour line representing the intersection of said planar surface with said virtual image is recorded by photographing it.

4. The method of claim 2 wherein information relating to said contour line is recorded by measuring the coordinates at various points along said contour line.

5. The method of claim 2 wherein information relating to said contour line is recorded by bringing a probe point into optical alignment with various points along said line and determining the coordinates of said probe at such position.

6. The method of claim 2 wherein said plane surface is successfully moved into a plurality of positions with respect to said object and recordings of said contour lines thus produced are made at each such positions.

7. The method of claim 2 wherein information relating to said contour line is recorded by a camera positioned with its film surface parallel to said planar surface.

8. Apparatus for recording information relating to the coordinates along a three dimensional contoured body, comprising: a hologram of the body; a light source for illuminating the hologram so as to produce a virtual image of said body; a plane surface adapted to be supported in intersection with said virtual image so as to make visible a contour line representing the intersection between said plane surface and the surface of said body; and means for recording information relating to said contour line.

9. The apparatus of claim 8 wherein said means for recording information relating to said contour lines consists of a camera.

10. The apparatus of claim 8 wherein said means for recording information relating to said contour line consists of probing apparatus adapted to be supported in contact with various points along said contour line.

References Cited

E. G. Nassimbene and R. M. Ross; 3-D Holograms, IBM Technical Disclosure Bulletin, vol. 8, No. 10, March 1966, page 1403.

RICHARD B. WILKINSON, *Primary Examiner.*

J. W. HARTARY, *Assistant Examiner.*

U.S. Cl. X.R.

33—174; 346—107; 350—3.5